US008400455B2

(12) United States Patent
Gregory et al.

(10) Patent No.: US 8,400,455 B2
(45) Date of Patent: Mar. 19, 2013

(54) METHOD AND APPARATUS FOR EFFICIENT OFFSET CURVE DEFORMATION FROM SKELETAL ANIMATION

(75) Inventors: Arthur Gregory, Culver City, CA (US); Dan Weston, Santa Clarita, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 593 days.

(21) Appl. No.: 12/349,818

(22) Filed: Jan. 7, 2009

(65) Prior Publication Data

US 2009/0179899 A1    Jul. 16, 2009

Related U.S. Application Data

(60) Provisional application No. 61/020,678, filed on Jan. 11, 2008.

(51) Int. Cl.
*G06T 13/00* (2006.01)
*G09T 5/26* (2012.01)

(52) U.S. Cl. ......... 345/473; 345/472; 345/474; 345/475

(58) Field of Classification Search .................. 345/442, 345/443, 472
See application file for complete search history.

(56) References Cited

U.S. PATENT DOCUMENTS

| | | | |
|---|---|---|---|
| 5,892,691 A * | 4/1999 | Fowler | 703/6 |
| 6,204,860 B1 * | 3/2001 | Singh | 345/420 |
| 6,317,130 B1 * | 11/2001 | Ishikawa et al. | 345/473 |
| 7,088,367 B2 | 8/2006 | Boyd et al. | |
| 7,236,170 B2 | 6/2007 | Sepulveda | |
| 2004/0001064 A1 * | 1/2004 | Boyd et al. | 345/473 |
| 2004/0095352 A1 | 5/2004 | Huang | |
| 2007/0035541 A1 * | 2/2007 | Isner et al. | 345/420 |
| 2007/0097123 A1 * | 5/2007 | Loop et al. | 345/442 |
| 2007/0268293 A1 * | 11/2007 | Miller et al. | 345/473 |
| 2009/0002376 A1 * | 1/2009 | Xu et al. | 345/473 |

OTHER PUBLICATIONS

Forstmann et al., "Skeletal Animation by Spline aligned Deformation on the GPU," The Institute of Electronics, http://www.xinix.org/sven/main/publications/Spline.Skinning.pdf, 6 pages.

Forstmann et al., "Deformation Styles for Spline-based Skeletal Animation," Eurographics/ACM SIGGRAPH Symposium, (2007) pp. 141-150.

Forstmann, S., and Ohya, J., Fast skeletal animation by skinned arc-spline based deformation. In Eurographics 2006: Short Papers, (2006) pp. 1-4.

Barr, A. H., Global and local deformations of solid primitives. In Computer Graphics (Proceedings of ACM SIGGRAPH 84), ACM, (1984) pp. 21-30.

Bartels, R.. H., and Hardock, R. T. Curve-to-curve associations in spline-based inbetweening and sweeping. In Computer Graphics (Proceedings of ACM SIGGRAPH 89), ACM, (1989) pp. 167-174.

(Continued)

*Primary Examiner* — Aaron M Richer
*Assistant Examiner* — Leon T Cain, II
(74) *Attorney, Agent, or Firm* — Fitch, Even, Tabin & Flannery LLP

(57) ABSTRACT

A method for use in animation includes establishing an influence primitive, associating the influence primitive with a model having a plurality of model points, and for each of the plurality of model points on the model, determining an offset primitive that passes through the model point. Another method includes deforming the model, and determining a deformed position of each of the plurality of model points by using a separate offset primitive for each model point. A computer readable storage medium stores a computer program adapted to cause a processor based system to execute one or more the above steps.

28 Claims, 14 Drawing Sheets

OTHER PUBLICATIONS

Bloomenthal, J., Medial-based vertex deformation. In SCA '02: Proceedings of the 2002 ACM SIGGRAPH/Eurographics symposium on Computer animation, ACM, New York, NY, USA, (2002) pp. 147-151.

Elber, G., Lee, I.-K., and Kim, M.-S., Comparing offset curve approximation methods. IEEE Computer Graphics and Applications 17, 3, (1997) pp. 62-71.

Cohen, E., Riesenfeld, R. . F., and Elber, G., Geometric modeling with splines: an introduction. A. K. Peters, Ltd., Natick, MA, USA, (2001) pp. 183-185.

Dam, E. B., Koch, M., and Lillholm, M., Quaternions, interpolation and animation. Tech. Rep. DIKU-TR-98/5, Department of Computer Science, University of Copenhagen, (1998) 103 pgs.

Hu, S.-M., and Wallner, J., A second order algorithm for orthogonal projection onto curves and surfaces. Computer Aided Geometric Design 22, 3, (2005) pp. 251-260.

Kavan, L., and Zara, J., Spherical blend skinning: a real time deformation of articulated models. In I3D '05: Proceedings of the 2005 symposium on Interactive 30 graphics and games, ACM, (2005) pp. 9-16.

Kavan, L., Collins, S., Zara, J., and O'Sullivan, C., Skinning with dual quaternions. In I3D '07: Proceedings of the 2007 symposium on Interactive 30 graphics and games, ACM, (2007) pp. 39-46.

Kho, Y., and Garland, M., Sketching mesh deformations. In I3D '05: Proceedings of the 2005 symposium on Interactive 30 graphics and games, ACM, (2005) pp. 147-154.

Kim, M.S., Park, E.J., and Lee, H.Y., Modeling and animation of generalized cylinders with variable radius offset space curves. The Journal of Visualization and Computer Animation 5, 4, (1994) pp. 189-207.

Lazarus, F., Coquillart, S., and Jancbne, P., Interactive axial deformations. Tech. Rep. RR-1891, INRIA, (1993) 21 pages.

Lewis, J. P., Cordner, M., and Fong, N., Pose space deformation: a unified approach to shape interpolation and skeleton-driven deformation. In Proceedings of ACM SIGRRAPH 2000, ACM, (2000) pp. 165-172.

Rhee, T., Lewis, J., and Neumann, U. Real-time weighted pose-space deformation on the gpu. Computer Graphics Forum, 25, 3, (2006) pp. 439-448.

Shoemake, K., Fiber Bundle Twist Reduction. Academic Press Professional, Inc., San Diego, CA, USA. (1994) 10 pages.

Singh, K., and Fiume, E., Wires: a geometric deformation technique. In Proceedings of ACM SIGGRAPH 98, ACM, (1998) 10 pages.

Wang, X. C., and Phillips, C., Multi-weight enveloping: least-squares approximation techniques for skin animation. In SCA '02: Proceedings of the 2002 ACM SIGGRAPH/Eurographics symposium on Computer animation, ACM, New York, NY, USA, (2002) 11 pages.

Yang, X., Somasekharan, A., and Zhang, J. J., Curve skeleton skinning for human and creature characters: Research articles. Comput. Animat. Virtual Worlds 17, 3-4, (2006) pp. 281-292.

Peng et al., "Arc-Length-Based Axial Deformation and Length Preserving Deformation," State Key Lab of CAD&CG, Zhejiang University. (1997) pp. 86-92.

Khan et al. "Hovercam: Interactive 3d navigation for proximal object inspection." In Proceedings of the 2005 Symposium on Interactive 3D Graphics and Games (SI3D 05), (2005) pp. 73-80.

Wallner, Johannes, "Self-Intersections and Smoothness of General Off-Set Surfaces." Journal of Geometry, vol. 70, No. 1-2, (2001) 13 pgs.

Gregory et al., "Offset Curve Deformation from Skeletal Animation"; Sony Pictures Imageworks; SIGGRAPH; Los Angeles, California, Aug. 11-15, 2008, 1 page.

Wang, R . Y., Pulli, K., and Popovic, J., Real-time enveloping with rotational regression. ACM Transactions on Graphics 26, 3, (2007) 9 pgs.

Hohmeyer, M. E., and Barsky, B. A., Skinning rational b-spline curves to construct an interpolatory surface. CVGIP: Graphical Model and Image Processing vol. 53, Issue 6, (1991) pp. 511-521.

Tiller, W., and Hanson, E. G., Offsets of two dimensional profiles. IEEE Computer Graphics and Applications, 4, 9, (1993) pp. 36-46.

Woodward, C. D. 1988. Skinning techniques for interactive b-spline surface interpolation. Comput. Aided Des. 20, 10, (1988) pp. 441-451.

Forstmann et al., "Skeletal Animation by Spline aligned Deformation on the GPU," The Institute of Electronics, http://www.xinix.org/sven/main/publications/Spline.Skinning.pdf, Mar. 19, 2007, 6 pages.

\* cited by examiner

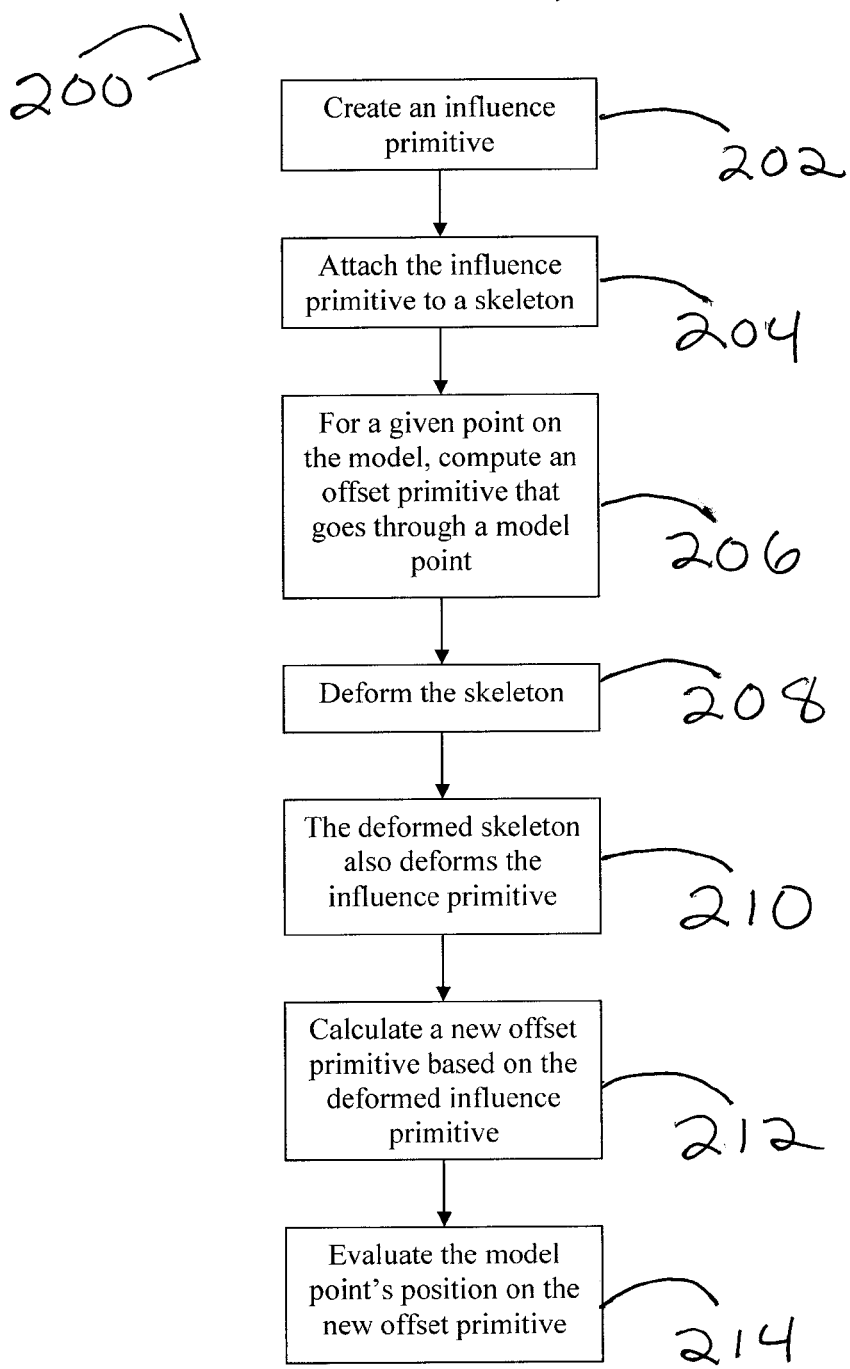

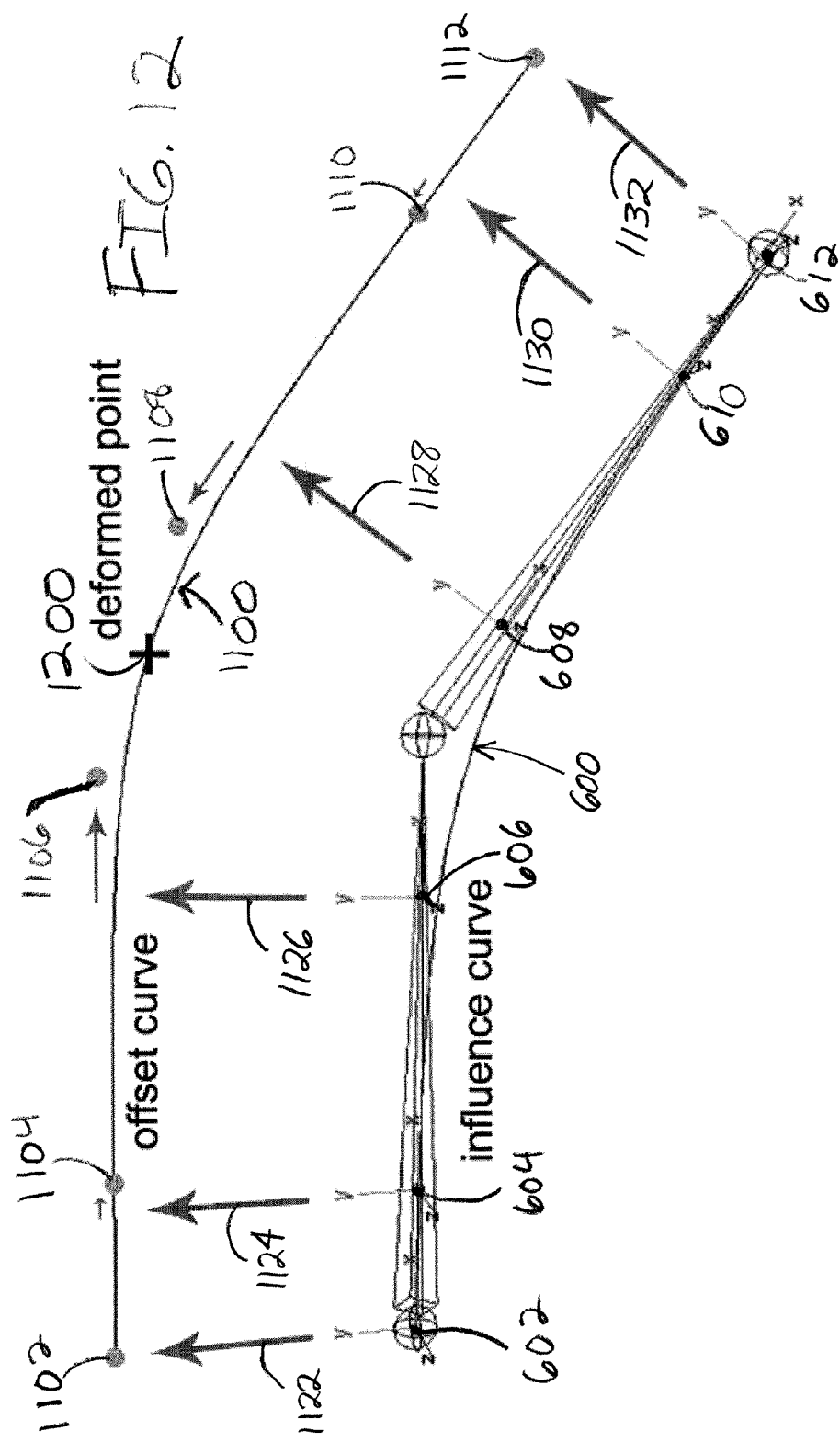

METHOD AND APPARATUS FOR EFFICIENT OFFSET CURVE DEFORMATION FROM SKELETAL ANIMATION

CROSS-REFERENCE TO RELATED APPLICATIONS

This application claims the benefit of U.S. Provisional Patent Application No. 61/020,678, filed Jan. 11, 2008, entitled "EFFICIENT OFFSET CURVE DEFORMATION FROM SKELETAL ANIMATION," the entire disclosure of which is hereby incorporated by reference herein in its entirety.

BACKGROUND OF THE INVENTION

1. Field of the Invention

The present invention relates generally to computer animation, and more specifically to skinning techniques used in computer animation.

2. Discussion of the Related Art

Computer animation involves building an animated three-dimensional (3D) figure or character on a computer display monitor that is rigged with a virtual skeleton. A full wire frame model, or a model built of polygons, is formed that typically includes a plurality of joints (sometimes called "bones") that allow the model to move or "deform" into different positions or poses. Surfaces, such as skin, eyes, mouth, etc., are added to the model during the rendering process. A skinning system is typically used to add such surfaces.

SUMMARY OF THE INVENTION

One embodiment provides a method for use in animation, comprising: establishing an influence primitive; associating the influence primitive with a model having a plurality of model points; and for each of the plurality of model points on the model, determining an offset primitive that passes through the model point.

Another embodiment provides a computer readable storage medium storing a computer program adapted to cause a processor based system to execute steps comprising: establishing an influence primitive; associating the influence primitive with a model having a plurality of model points; and for each of the plurality of model points on the model, determining an offset primitive that passes through the model point.

Another embodiment provides a method for use in animation, comprising: establishing an influence primitive; associating the influence primitive with a model having a plurality of model points; deforming the model; and determining a deformed position of each of the plurality of model points by using a separate offset primitive for each model point.

Another embodiment provides a computer readable storage medium storing a computer program adapted to cause a processor based system to execute steps comprising: establishing an influence primitive; associating the influence primitive with a model having a plurality of model points; deforming the model; and determining a deformed position of each of the plurality of model points by using a separate offset primitive for each model point.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein:

FIG. 2 is a flow diagram illustrating a method for use in animation in accordance with an embodiment of the present invention;

FIG. 12 is a diagram illustrating the deformed offset curve passing through the deformed model point offset from the influence curve by vector v, in accordance with an embodiment of the present invention;

DETAILED DESCRIPTION

Figure 1A:
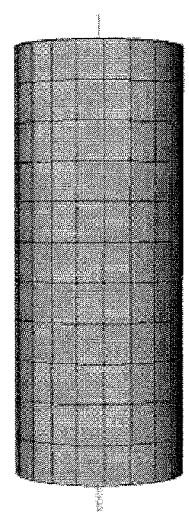
FIGS. 1A, 1B, 1C and 1D are diagrams illustrating various previous skinning techniques.

Skeletal skinning, the process of deforming geometry modeled in a base pose to maintain an offset from an underlying skeleton as it undergoes animation, is an important part of the modern animation pipeline. Both affine combination and bind-point deformation techniques suffer from several well-known artifacts: volume loss at a bend, "candy wrapper" pinching under twist, and surface self-intersection on the inside of a bend at offsets exceeding the radius of curvature. Various techniques exist to compensate for these, but most provide either too little flexibility or require too much artist intervention.

Embodiments of the present invention provide a novel skinning technique that minimizes the above artifacts while preserving efficiency. In some embodiments, the skinning technique may comprise a novel efficient approximation of offset curve deformation, which may be referred to herein as "OCD". In some embodiments, primitives may be used instead of curves, such that the skinning technique may comprise a novel efficient approximation of offset primitive deformation. The below discussion deals primarily with embodiments of OCD, but it should be well understood that some embodiments of the present invention include offset primitive deformation.

In some embodiments, OCD abandons the usual "point on a stick" technique, where the deforming influence is localized to a point, in favor of a more global (and stable) influence: an entire distinct intermediate (or "offset") curve for each model point, offset from the influence curve, that passes through the model point. True offset curves are generally too inefficient for use in computer graphics, except for specific shapes such as arc-segments (alternating circular arcs and line segments) which may be implemented procedurally. In some embodiments, for more general cases, approximating B-splines may be used which offer abundant and intuitive artist control over the final result. Although the bind-time cost is higher than that of traditional affine combination techniques, the deformation time is comparable, and experience suggests that most artists have produced a better result in less time.

By way of introduction, skin deformation based on an underlying skeleton is a standard practice in character animation. Existing techniques are designed to minimize the known artifacts present in linear blend skinning, in varying trade-offs of computational cost, complexity, artist setup time, and quality.

One class of techniques employs intermediate influence primitives. When restricted to simple quick-to-compute cases such as B-splines or arc-segments, they can be introduced while achieving deformation speeds comparable to that of linear blend skinning. However, many or all of these techniques suffer from offset distortion, which increases with the distance of a deformed point from its intermediate primitive and causes volume loss, stretching artifacts, and self-intersection.

Some embodiments of the present invention attempt to avoid this trade-off between cost and quality by introducing (for each model point) a curve offset from the influence curve that passes through the model point. This allows in a natural way for the blending of influences affecting a given point, such as linear blending via artist-painted per-influence weight maps. The curves can be offset locally for use with skeleton-driven pose space deformation. Having a distinct deforming primitive for each model point also gives the user an extra level of control of its deformation. For example, points inside a bend can slide out to avoid self-intersection artifacts, and points on the outside of a bend can slide in to reduce stretching.

In some embodiments, the offset curve in OCD may be modeled both procedurally as an arc-segment (circular arc between two line segments) tailored to geometries that have this specialized form (elbow, knuckles) and with B-splines for more general geometries (shoulder, chest, neck) and greater user control. The two offset models are discussed and compared below.

In some embodiments, the OCD algorithm can be divided up into two distinct phases: binding and deformation. The bind operation is more time-consuming, but only needs to be updated when the model shape or bind control parameters change. The deform operation occurs whenever the skeleton is animated.

Skinning methods can be categorized according to the locality of the influence mechanism. Affine combination uses no influence primitive at all. Bind-point and scattered interpolation techniques have point-like influences (i.e. localized to a finite number of points). Offset curves have a nonlocal influence.

In some embodiments, the OCD implementation described herein may comprise an offset curve method with nonlocal influence.

With respect to affine combination, perhaps the simplest method of skinning is the affine blending of model point transformed by various spaces, known variously as linear blend skinning (LBS) or skeleton subspace deformation (SSD). It is appealing due to its simplicity and ease of implementation on modern GPUs, and because it is independent of any particular choice of origin (bind point), it is manifestly unaffected by global translation and rotation. However, linear blend skinning suffers from well-known drawbacks. Some of these have been addressed in various ways, such as the construction of a medial axis in combination with convolution techniques [see Bloomenthal 2002, cited below] to reduce artifacts.

Spherical blend skinning [see Kavan and Zara 2005, cited below] blends mean translation separately from rotation about the center of mass. A subsequent publication proposes a faster algorithm using dual quaternions [see Kavan et al. 2007, cited below] to blend translation and rotation together to obtain the shortest path of screw motion (mean translation with twist). For an exhaustive survey of techniques for interpolating a sequence of rotations, see Dam et al. 1998, cited below.

Point-bind techniques are a local-influence deformation scheme. Although they may blend a set of model-point transformations, each model point transformation depends only on the coordinate frame of a single bind point.

Axial deformations [see Lazarus et al. 1993, cited below] introduce the technique of constructing an intermediate curve. The skeleton deforms the intermediate curve, which itself deforms the model. Each model point is bound to a point on the curve (usually the closest one) at which an intrinsic curve coordinate frame is determined (Frenet or minimal torsion). The model point is then constrained to remain at a given vector offset in the local frame of its bind point as the latter undergoes deformation.

The interactive nature of axial deformation techniques had previously been demonstrated with straight [see Barr 1984, cited below] and curved [see Lazarus et al. 1993, cited below] axes. The intuitive control offered by curve primitives even off-axis was demonstrated in [see Kho and Garland 2005, cited below]. Using the skeleton to drive this curve, as well as the interpolation of twist using a spline curve, was exploited in [see Yang et al. 2006, cited below].

The use of Wires [see Singh and Fiume 1998, cited below] expands this technique with the use of domain curves to establish domains of influence and does not require that the influence curve be aligned with the skeleton. It also allows for independently establishing the twist component of the curve via a spline interpolation.

Arc-spline based deformation [see Forstmann and Ohya 2006, cited below] restricts the Wires technique to a subset that can be efficiently implemented on a GPU: returning to an intrinsic curve frame (Frenet) and using arc-splines instead of B-splines.

Another class of techniques constructs a continuum field given a set of sampled values, then evaluates the field to interpolate between the samples. This is sometimes referred to as Scattered Interpolation.

Rotational regression [see Wang et al. 2007, cited below] uses example-based enveloping to "learn" the best rotational model for each joint given a surface under various poses.

Multi-weight enveloping [see Wang and Phillips 2002, cited below] uses a least squares approximation to interpolate between the sample poses.

Pose space deformation [see Lewis et al. 2000, cited below] and [see Rhee et al. 2006, cited below], maps sample displacements in the object local coordinate frames to an abstract "pose space", then interpolates the pose space using e.g. radial basis functions and applies the inverse mapping.

Offset curve skinning algorithms [see Woodward 1988; Hohmeyer and Barsky 1991, cited below] construct isocurves in the undeformed surface, offset these, and then skin the result using a sweep surface technique. This may be referred to as sweep surfaces using offset curves.

The blending of generalized cylinders by means of modeling their cross-sectional perimeters as closed variable-radius 2D offset curves [see Kim et al. 1994, cited below] was suggested as suitable for applications in computer animation, although no follow-on implementation was reported.

In some embodiments, the approach described herein differs fundamentally from these two offset surface methods in remaining a point deformer. In some embodiments, the offset curves serve only as an intermediate point-deforming primitive, evaluated at a single (bind) parameter, and are not themselves embedded in the deformed surface. In fact, since neither the bind point nor offset vector need be individually continuous (only their sum), the ensemble of offset curves may not even form a valid surface.

Figure 1B:
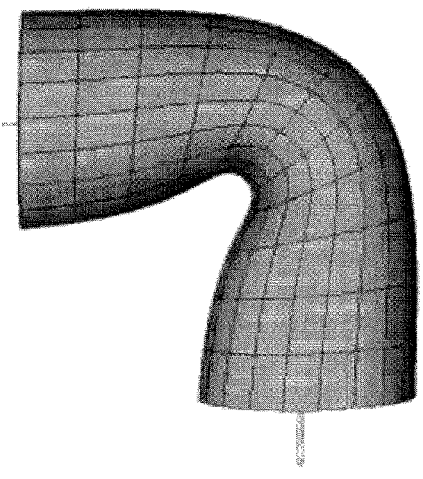
Figure 1C:
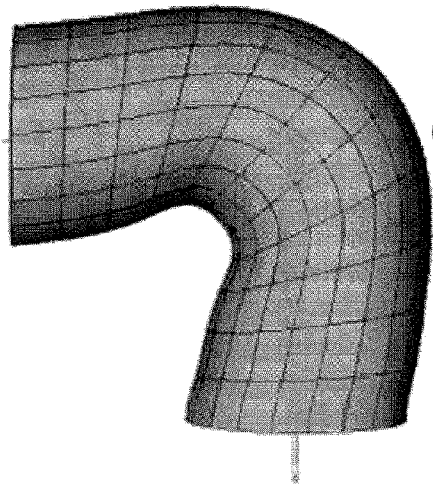
Figure 1D:
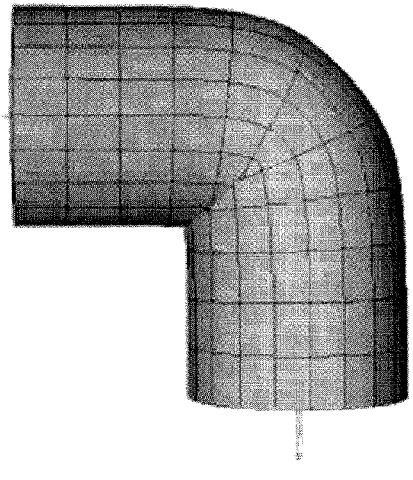
Figure 1E:
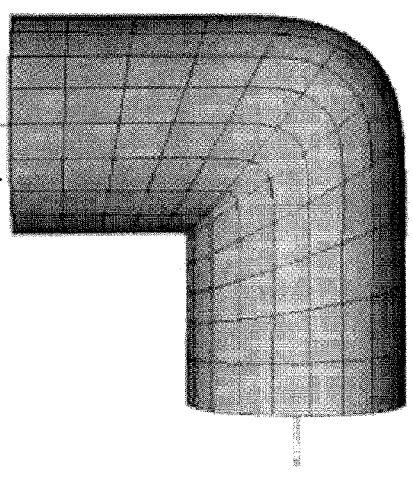
FIGS. 1E and 1F are diagrams illustrating skinning techniques according to embodiments of the present invention.
Figure 1F:
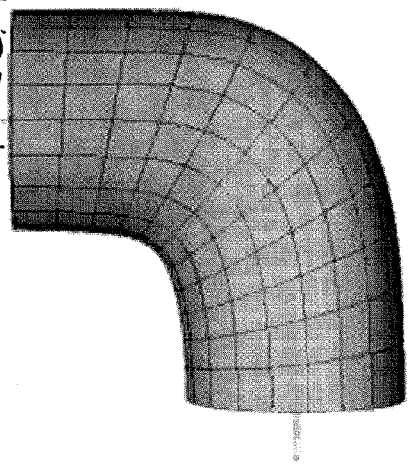

FIGS. 1A-1F illustrates a comparison of two example embodiments of the OCD process described herein with some of the above techniques where they are applied to a cylinder bent 90°. Specifically, FIG. 1A illustrates an undeformed cylinder. FIG. 1B illustrates a linear blend technique, FIG. 1C illustrates a dual quaternion technique, and FIG. 1D illustrates a Maya wire deformer technique. FIG. 1E illustrates an OCD arc-segments technique in accordance with an embodiment of the present invention, and FIG. 1F illustrates an OCD B-splines technique in accordance with an embodiment of the present invention.

FIG. 2 illustrates a method 200 for use in animation in accordance with an embodiment of the present invention. In some embodiments, the method 200 may be used for implementing the above-mentioned OCD skinning technique. The method 200 begins in step 202 in which an influence primitive is created and/or established. In step 204 the influence primitive is attached to a skeleton. In step 206, for a given point on the model, an offset primitive that passes through the model point is computed. In some embodiments, the offset primitive is an arc-segment, B-spline, NURBS curve, or any other suitable primitive. In step 208, the skeleton is deformed. In step 210, the deformed skeleton also deforms the influence primitive. For step 212, there is a new offset primitive calculated based on the deformed influence primitive. In some embodiments, the offset primitive is an arc-segment, B-spline, NURBS curve, or any other suitable primitive. Then in step 214, the model point's position on the new offset primitive is evaluated or otherwise determined or computed.

As mentioned, in step 202 an influence primitive is created and/or established. In some embodiments, the influence primitive may comprise an influence curve. In some embodiments, there may be multiple influence curves and/or primitives. The model point deformation is calculated independently for each influence curve, then linearly blended using artist supplied weights. Initial default weights are computed automatically based on distance.

In some embodiments, when the offset curve is an arc-segment. The influence curve is simply the (piecewise-linear) curve of connected joint axis (bones).

In some embodiments, offset curves can be B-spline curves. For B-spline offset curves, B-spline influence curves are needed. To ensure non-deformation for bind points outside the influence range and smooth onset of deformation at each end, the last two control points of the influence curve are constrained not to move (relative to their common parent joint) under skeletal animation. Initially, B-spline influence control points are typically placed ¼ and ¾ along the axis of selected joints. The artist may move these control points (or add new ones) to shape the influence as desired, although preferable results may be obtained from a relatively low number of control points to avoid high curvature or spatial variation in curve shape.

Figure 3:
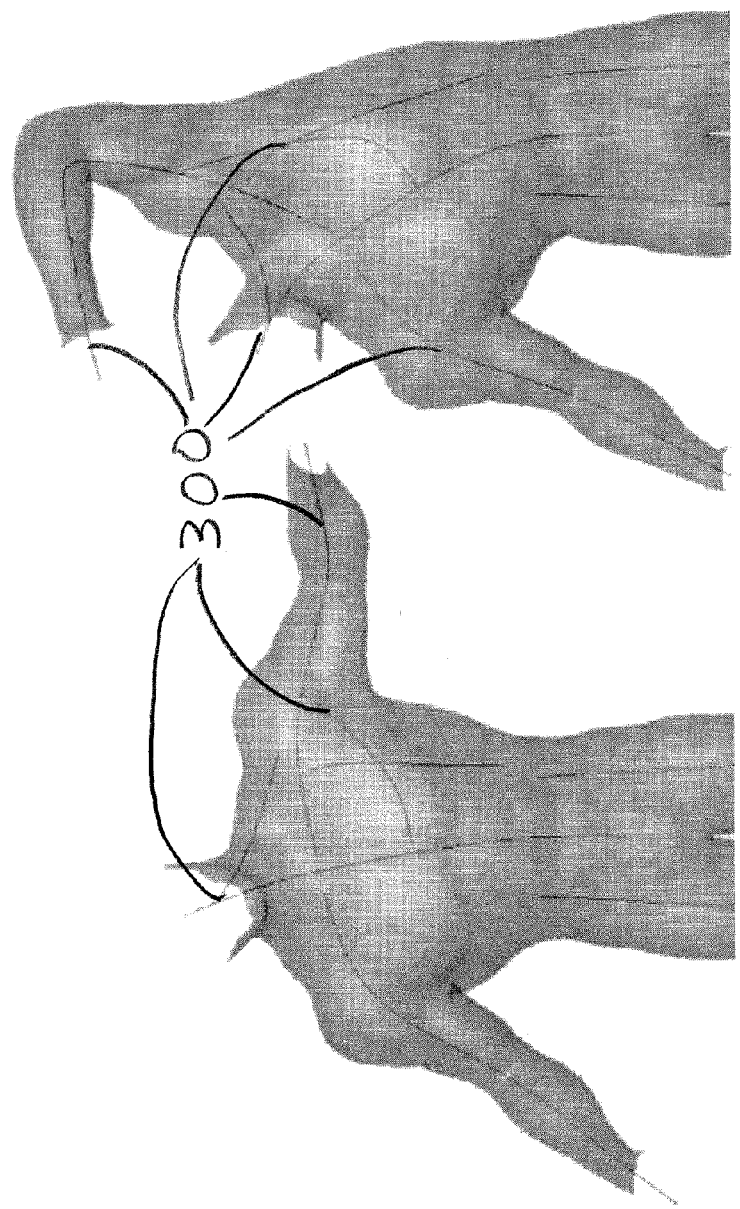
FIG. 3 is a diagram illustrating an example of B-spline influence curves for an upper torso.

As mentioned above, in step 204 the influence primitive is attached to a skeleton. FIG. 3 illustrates an example of B-spline influence curves for an upper torso. Examples of several influence curves 300 run throughout the torso.

As mentioned above, in step 206 (FIG. 2), for a given point on the model, an offset primitive that passes through the model point is computed or otherwise determined. In some embodiments this step may be part of a bind computation. For example, preferably every model point is mapped to a point on the influence curve at bind time, which is scheduled to refresh before the next deform cycle whenever the influence curve is deformed. How this is done depends on the offset curve model and is discussed below.

A local coordinate system at the bind point is preferred. For more precise artist control (and to avoid problems with piecewise-linear influence curves), the local coordinate system at the bind point is not derived from the influence curve itself (Frenet or minimum torsion frame). Instead, as in [see Singh and Fiume 1998, cited below], the parent joints' coordinate system are decomposed into a twist (about some twist axis) [see Shoemake 1994, cited below], a simple rotation normal to the twist axis, and a scale. There is no further use of the simple rotation, the effect of which is already transmitted via the control point translations. The twist and scale components are individually interpolated using artist-provided spline curves or other primitive. The results are then recomposed and saved. The artist can also modify the twist axis (by default aligned with the joint axis) if necessary.

Then, the fractional arc-length of the bind point along the influence curve is saved as the bind parameter, although it is calculated in closed form only for piecewise-linear influence curves and arc-segment offset curves. B-spline influence and offset curves are approximated by the arc-length with the spline parameter. The resulting error is largely reversed when the offset curve (also a B-spline) is interpolated using the same spline parameter.

In some embodiments, the influence curve needed to drive the arc-segment offset curve is piecewise-linear, namely just the two connected joint axes themselves, which forms a piecewise-linear influence curve. As such, their deformation under skeletal animation is trivial. This also allows the binding and evaluation to be done in closed form for speed. As the offset arc-segment is procedurally determined, the bind point itself is not used. Only the bind parameter needs to be determined, which is just the fractional arc-length $\tau$, obtained in equation 10 below.

When interpolating arc-segment (in contrast to B-spline) offset curves, it is necessary for the bind point to vary continuously with the model point. A simple closest-point bind algorithm would be discontinuous for bent-joint bind poses as the model point approaches the joint bisecting plane. This result is avoided with a conceptually simple unfolding operation, akin to fully opening a partially open children's popup book.

Specifically, given two bones $\vec{OP}$ and $\vec{OQ}$ connected at their common point O, one can map a model point R to a bind point B as given by equations 1-10.

$$p = \vec{OP} \quad p = |p| \quad \hat{p} = p/p \tag{1}$$

$$q = \vec{OQ} \quad q = |q| \quad \hat{q} = q/q \tag{2}$$

$$r = \vec{OR} \quad r = |r| \quad \hat{r} = r/r \tag{3}$$

Let $\Theta = \angle QOR$ and $\alpha = \angle POQ$, ensuring that a is defined in the same direction as $\Theta$.

$$\Theta = \arccos(\hat{r} \cdot \hat{q}) \tag{4}$$

$$\alpha_{min} = \arccos(\hat{p} \cdot \hat{q}) \tag{5}$$

$$\alpha = \begin{cases} \alpha_{min} & \text{if } (\hat{p} \times \hat{q}) \cdot (\hat{r} \times \hat{q}) \geq 0 \\ 2\pi - \alpha_{min} & \text{otherwise} \end{cases} \tag{6}$$

The angles are preferably scaled until $\angle POQ$ lies flat to ensure that there is a unique and continuous nearest-neighbor bind mapping, which is simply the projection of the remapped model point onto the (now flat) common joint axis.

$$\alpha_{flattened} = \alpha(\pi/\alpha) \equiv \pi \tag{7}$$

$$\Theta_{flattened} = \Theta(\pi/\alpha) \tag{8}$$

$$\epsilon = r \cos \Theta_{flattened} \tag{9}$$

Then the bind parameter $\tau$ is determined, which is simply the fractional length along the flattened line segments $\vec{POQ}$.

$$\tau = \frac{a + a_{min}(0, \epsilon) + b_{max}(0, \epsilon)}{a + b} \tag{10}$$

Figure 4:
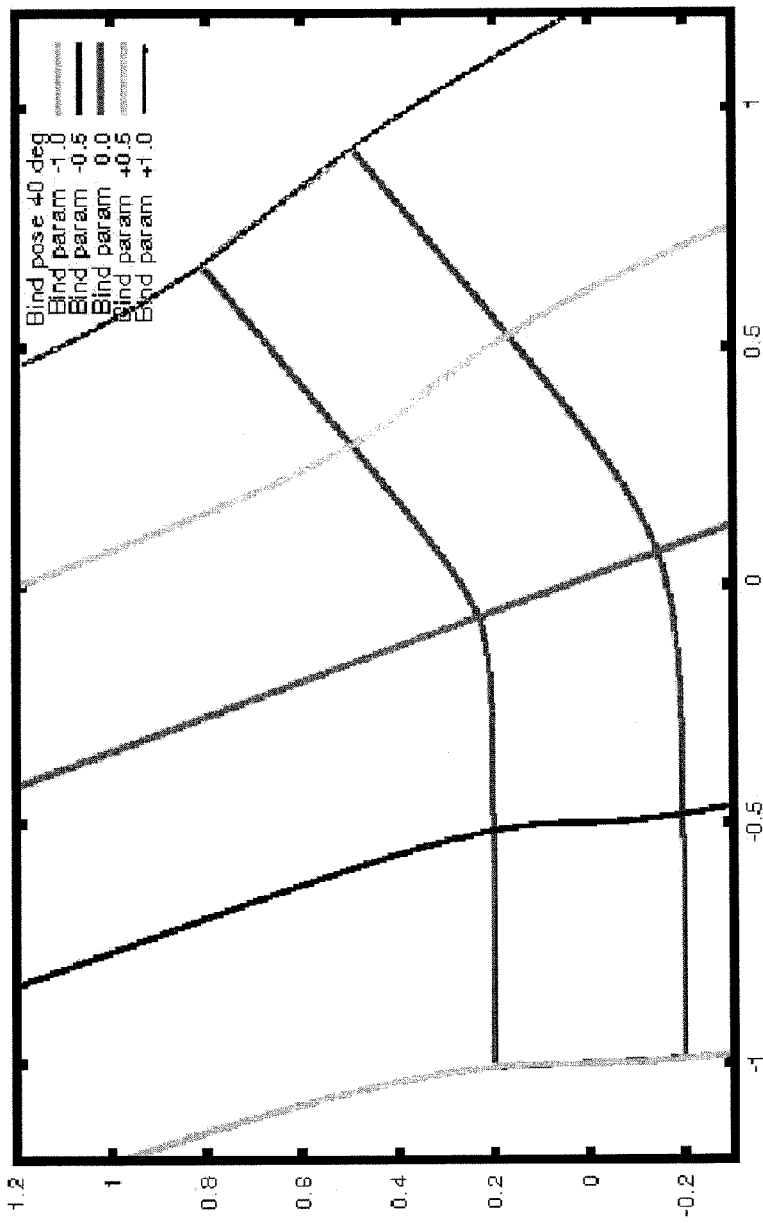
FIG. 4 is a graph illustrating points mapping to the same bind parameter.

FIG. 4 shows an example embodiment of the locus of points which project to the same bind parameter (i.e. curves which map to straight vertical lines in at space).

Figure 5:
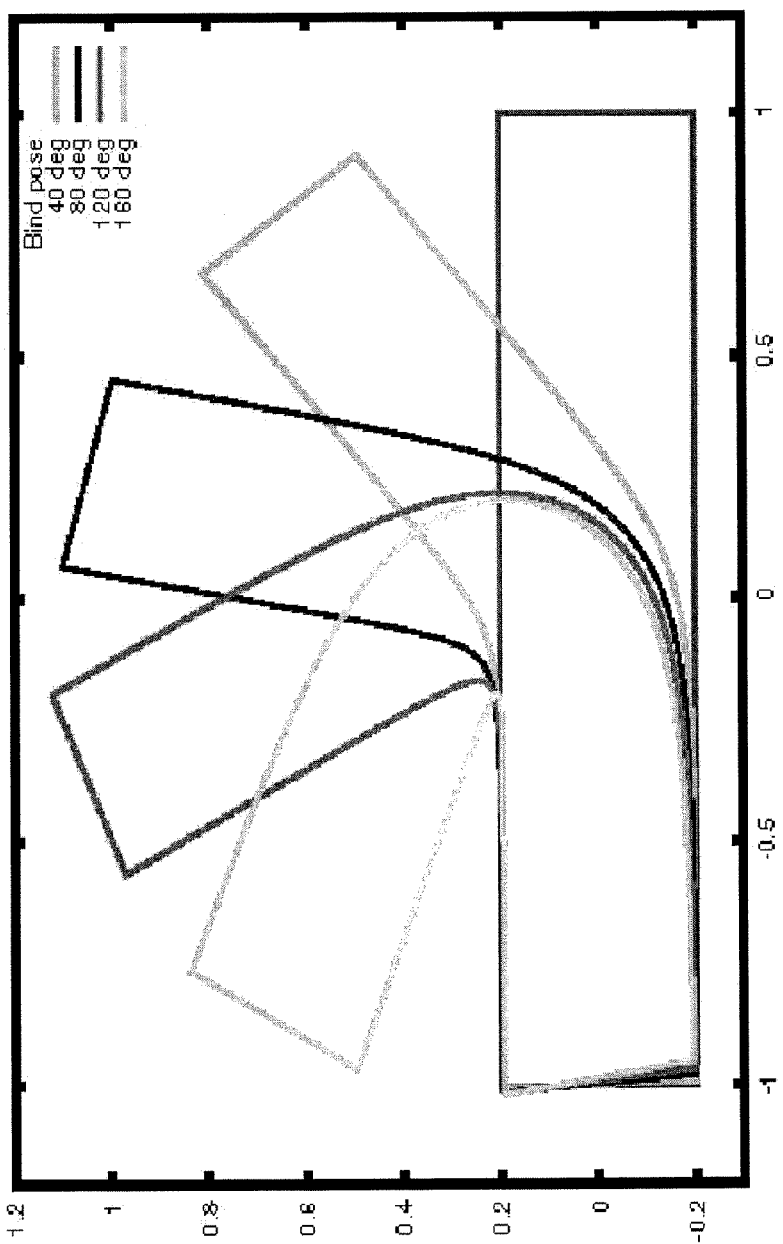
FIG. 5 is a graph illustrating applying the inverted bind remapping to a flat cylinder.

FIG. 5 demonstrates an example embodiment of the effect of inverting the bind remapping (from $\Theta_{flattened}$ back to $\Theta$) to transform a flat cylinder into various angular poses. Because the user has control over the rotational falloff, the deformed model point may deviate slightly from the undeformed model point in the bind pose (unless the bind pose is perfectly straight). Coincidence may be forced by adding a local error vector correction.

In another embodiment, the influence curve primitive needed to drive the B-spline offset curve is itself a B-spline, i.e. a B-spline influence curve. This allows for using the off-influence bind parameter r as an offset curve evaluation parameter for speed.

The point on a B-spline with influence control points $b_j$ at $\tau$ is given by $$b(\tau) = \sum_{j=i-k}^{i} b_j B_{j,k}(\tau) \tag{11}$$

where the B-spline blending functions $B_{j,k}(\tau)$ are defined as in [see Cohen et al. 2001, cited below]. One method uses cubic splines (k=3) for both influence and offset B-splines. This means that any point is a weighted blend of 4 control points.

There are several potential algorithms [e.g. Hu and Wallner 2005, cited below] for finding $\tau$ such that the point $b(\tau)$ on the B-spline is the closest to the model point $m_0$, namely where $|b(\tau) - m_0|$ is minimized and $(b(\tau) - m_0) \cdot b'(\tau) = 0$. In one embodiment, a simple implementation of the midpoint method is used to minimize distance. High accuracy is not required, since any small bind point error can be compensated for in the bind offset vector.

As in the piecewise-linear case, this mapping is discontinuous whenever a circle centered at the model point and tangent to the influence curve intersects the curve more than once. The simple space-unfolding algorithm used for binding to piecewise-linear curves does not work for curves in general. Consequently, it is preferred that the artist sketch fairly flat and smooth influence curves in the bind pose, taking care that the bind distance is everywhere less that the local radius of curvature. This is easily accomplished by limiting the number of influence control points to two or three per joint.

The deform algorithm takes a single vector offset v (computed at bind time), creates an offset spline, then interpolates it at the bind parameter. The deformed and undeformed model point should coincide at this parameter when in the bind pose, and a search is done on v to make this happen. In some embodiments, there always exists at least one (and in all but pathological cases, at most one) v for which the offset curve passes through the model point at the correct bind parameter.

A minimization algorithm is used to find the v which minimizes (actually, forces to zero) the distance $|m(\tau) - m_0|$ obtained by substituting the results obtained from equations 12 and 13 into equation 11.

The bind parameter and offset are recorded for use during the deform computation.

Turning next to the deform computation, as the skeleton is animated, the model points are deformed to follow. For consistency, the deformed model point must coincide with the undeformed model point in the bind pose. This is enforced by design (for arc-segments) and by search (for B-splines).

In some embodiments of the present invention, an arc-segment curve may be used as an offset primitive. Such an arc segment offset curve can be calculated procedurally as follows. Both offset segments are constructed to be (and remain) coplanar with the influence axes, each parallel to one of them and offset by the bind distance. Twist causes the model point to revolve about the twist axis, and this is produced by rotating each offset segment the same twist angle about its respective influence axis (while remaining parallel to it). As the two offset segments revolve, they remain coplanar as their point of intersection traces out an ellipse around the common influence joint in the axial plane rotated half way between the two influence segments. There is exactly one smallest circular arc connecting these coplanar offset segments for which the offset curve is everywhere G1-continuous. The arc-length of this segment-arc-segment (or just arc-segment, for short) is known in closed form and evaluated at the point of fractional arc-length given by the bind parameter.

In some embodiments, a B-spline curve may be used as an offset primitive. FIGS. 6-12 illustrate an example deform calculation on a B-spline offset curve. That is, the figures illustrate an example embodiment of the OCD process using B-spline influence and offset curves in accordance with an embodiment of the present invention.

Figure 10:
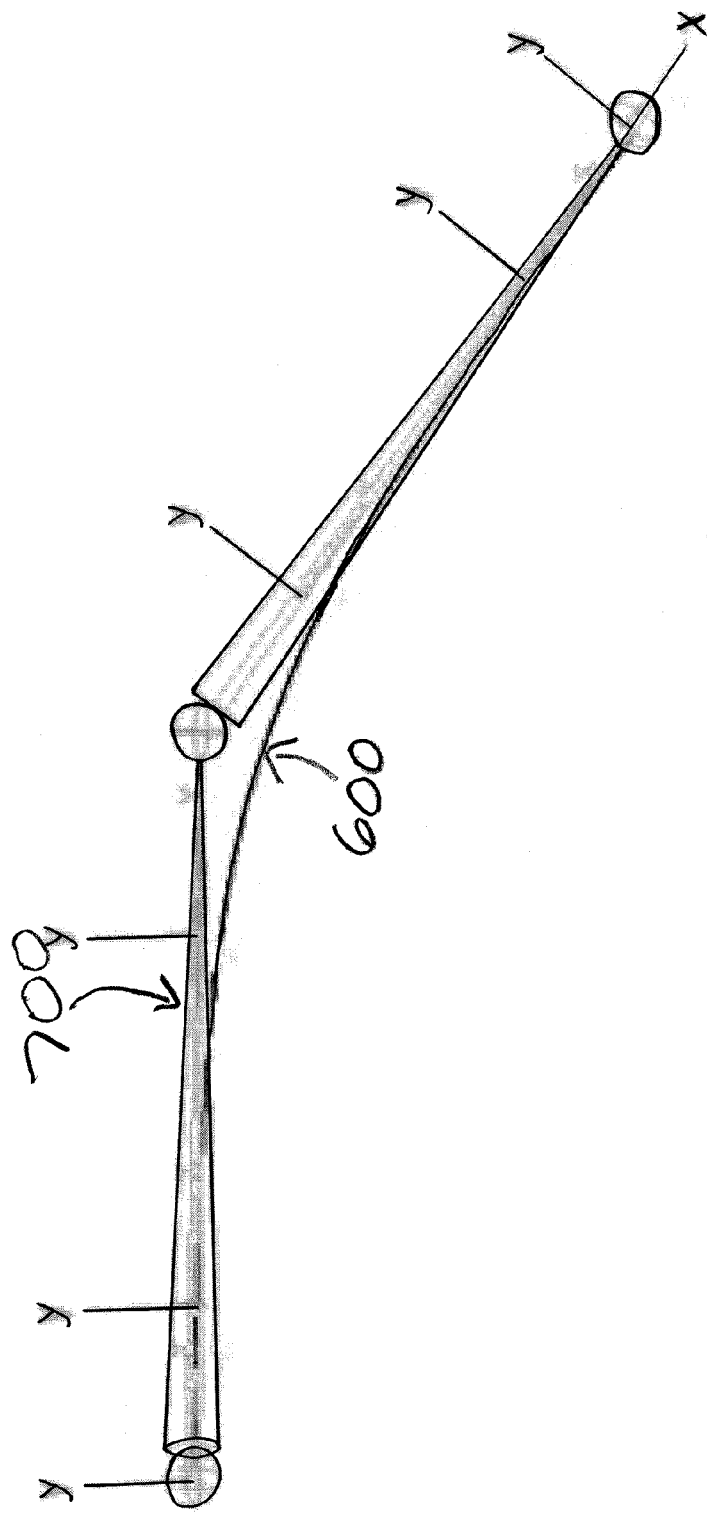
FIG. 10 is a diagram illustrating deforming an influence curve in accordance with an embodiment of the present invention.
Figure 11:
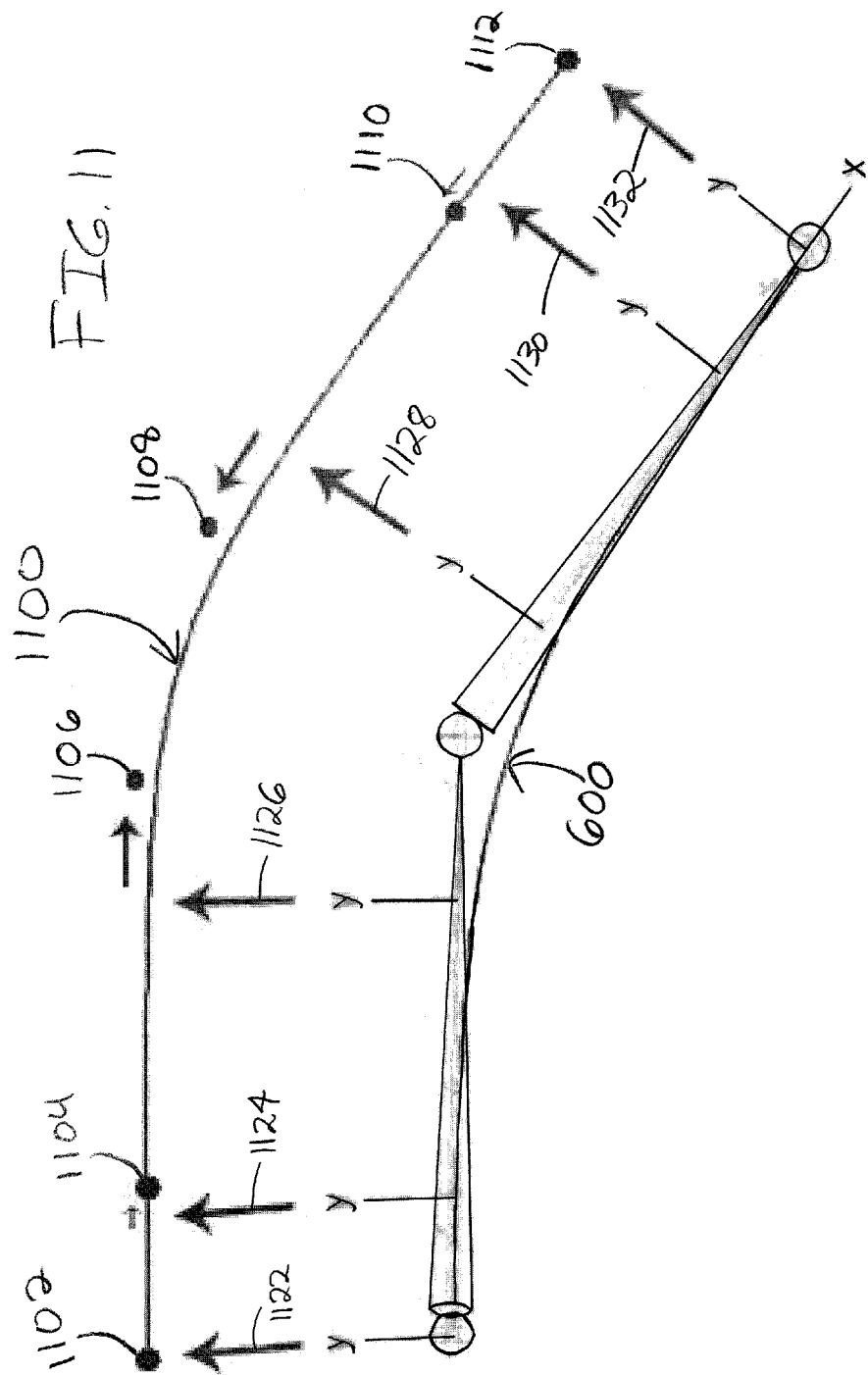
FIG. 11 is a diagram illustrating creating a deformed offset curve from the deformed influence curve in accordance with an embodiment of the present invention.

In some embodiments, the bind process (computing the offset curve) and deform process (evaluating the offset curve) are separated. This way the bind information can be efficiently cached, and the deform process is consequently very fast (<100 FLOPS). Furthermore, both the bind and deform processes may be done or run in parallel. FIGS. 6-9 illustrate an example of the bind process, and FIGS. 10-12 illustrate an example of the deform process.

Figure 6:
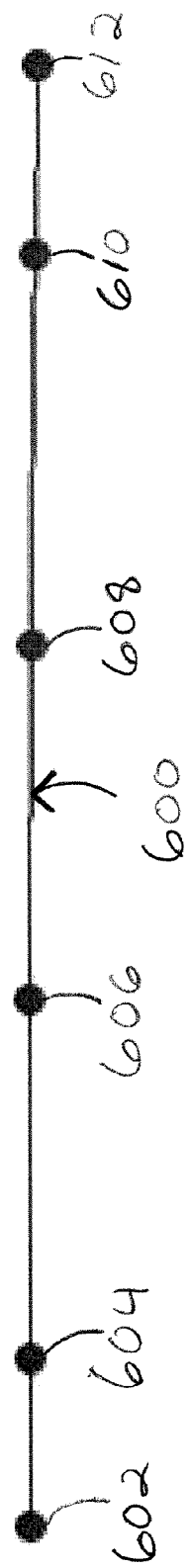
FIG. 6 is a diagram illustrating the establishment of an influence curve with control points in accordance with an embodiment of the present invention.

Specifically, FIG. 6 illustrates an example implementation of step 202 (FIG. 2), namely, the establishment of a B-spline influence primitive or curve 600. The B-spline influence curve 600 includes control points 602, 604, 606, 608, 610 and 612.

Figure 7:
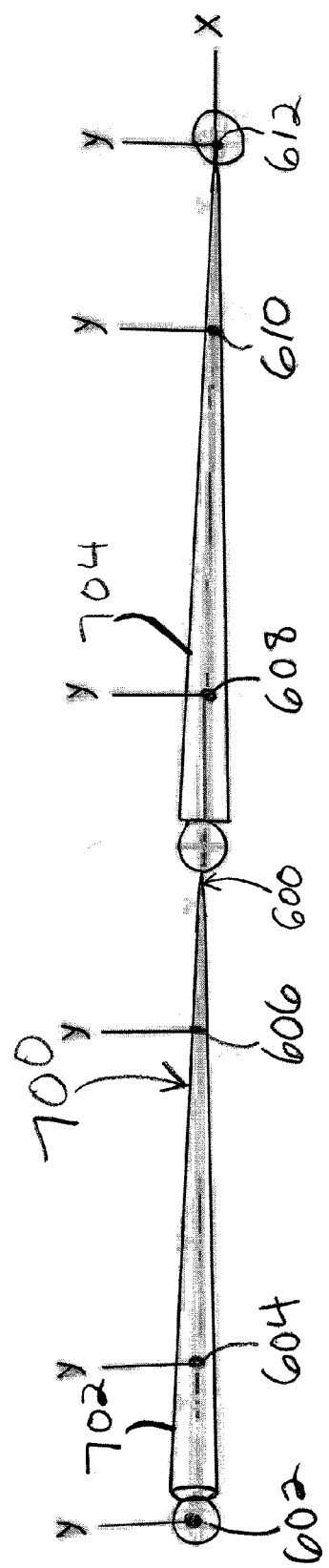
FIG. 7 is a diagram illustrating the attaching of bones to an influence curve in accordance with an embodiment of the present invention.

FIG. 7 illustrates an example implementation of step 204 (FIG. 2), namely, the attaching of the influence curve 600 with control points 602, 604, 606, 608, 610, and 612 to a skeleton 700. The skeleton 700 includes two connected bone sections 702 and 704. The skeleton 700 may be part of a model.

Figure 8:
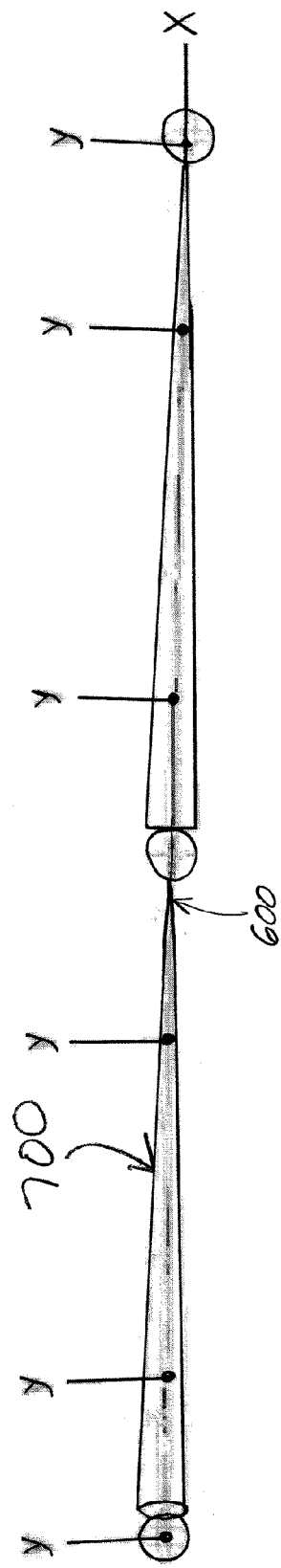
FIG. 8 is a diagram illustrating a model point positioning in accordance with an embodiment of the present invention.

FIG. 8 illustrates an example a model point 800 near the skeleton 700. The model point 800 may be one of a plurality of model points of the model.

Figure 9:
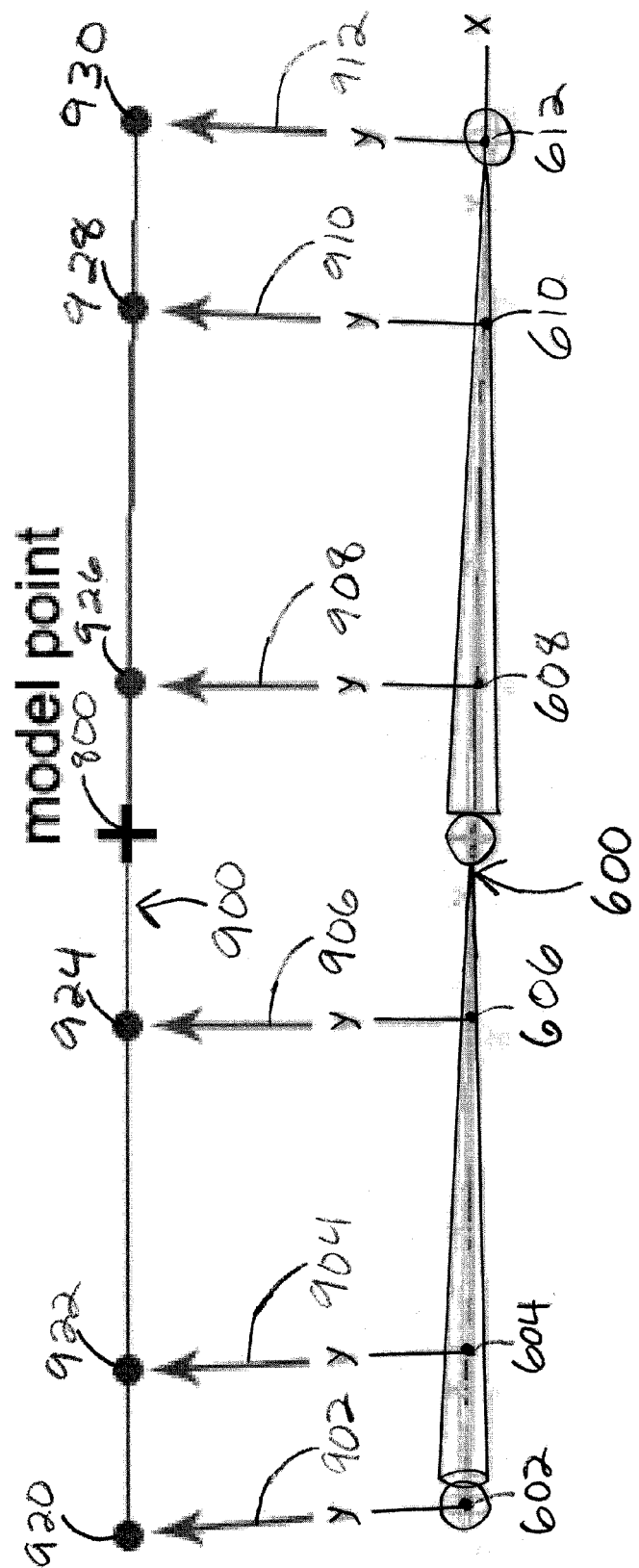
FIG. 9 is a diagram illustrating the forming of an offset curve that passes through the model point where the offset curve is offset from the influence curve by vector v, in accordance with an embodiment of the present invention.

FIG. 9 illustrates an example implementation of step 206 (FIG. 2), namely, the determination of an offset primitive or curve 900 that passes through the model point 800. In some embodiments, a separate offset curve is determined for each of the model points on the model. This step may be performed in the bind computation, and the offset curve 900 is used to make computations that will be used later in determining the position of the deformed model point. In some embodiments, the process makes use only of the point on the offset primitive that passes through the model point, discarding the rest.

As mentioned above, in some embodiments a single vector offset v is computed at bind time. Later, the deform algorithm takes the single vector offset v and creates an offset spline, then interpolates it at the bind parameter. In some embodiments, the use of a single offset vector is novel to OCD. The single offset vector is applied in the various local spaces of the control points of the influence primitive.

For example, for each control point 602, 604, 606, 608, 610 and 612, corresponding offset vectors v 902, 904, 906, 908, 910, and 912, may be computed. Before deformation, the control points 602, 604, 606, 608, 610 and 612 on the influence curve 600 evenly correspond to the control points 920, 922, 924, 926, 928, and 930 on the offset curve 900.

FIG. 10 illustrates an example implementation of step 208 (FIG. 2), namely, the deforming of the model, which deforms the underlying skeleton 700.

The deforming of the model 700 also deforms the influence curve 600 to establish a deformed influence primitive (step 210 in FIG. 2). The deforming of the model 700 also deforms the plurality of model points to establish corresponding deformed model points. The following steps are used to find the position of the deformed model points.

FIG. 11 illustrates an example implementation of step 212 (FIG. 2), namely, the determination or approximation of a new, deformed offset primitive or curve 1100 calculated based on the deformed influence curve 600. In some embodiments, a separate new, deformed offset primitive or curve is determined for each of the model points on the model.

A B-spline curve for offset curve approximation can be advantageous because it is inherently smooth, and at any given point on the spline, is fully defined by, and linear in, a small fixed number k+1 of nearby control points, where k is the degree of the B-spline basis. Consequently, [see Bartels and Hardock 1989, cited below, for proof] a well-behaved interpolation trajectory is expected using the bind parameter to interpolate the deformed model point.

In some embodiments, the offset approximation may be Cobb's method [1984, cited below] whereby each offset spline control point is offset by the same constant vector from the corresponding control points of the influence curve. However, Elber et al. [1997, cited below] report that this method underestimates the offset in regions of high curvature when the offset spline is constructed and applied in a common space and recommends instead translating each edge of the influence control polygon into the edge normal direction [see Tiller and Hanson 1993, cited below]. Nonetheless, Cobb's method provides simplicity and intuitive artist control but mitigates the underestimation (i.e. volume loss) by defining the offsets in the spatially-varying local space of each influence control point and interpolating the resulting spline in model space.

Thus, the deformed offset curve 1100 may be determined or otherwise computed or approximated using the deformed influence curve 600 and the computations made using the offset primitive or curve 900 (FIG. 9) that passes through the model point 800. As mentioned above, those computations may include computing the offset vectors v 902, 904, 906, 908, 910, and 912. After deformation, the offset vectors v 902, 904, 906, 908, 910, and 912 correspond (respectively) to the offset vectors v 1122, 1124, 1126, 1128, 1130 and 1132 shown in FIG. 11. The offset vectors 1122, 1124, 1126, 1128, 1130 and 1132 are used to calculate the corresponding control points 1102, 1104, 1106, 1108, 1110, and 1112 for the deformed offset curve 1100. Thus, in some embodiments, determining the deformed offset curve 1100 may involve calculating one or more control points 1102, 1104, 1106, 1108, 1110, and 1112 for the deformed offset primitive. This step can be preformed for a plurality of model points.

More specifically, given influence control point positions $b_j$ with local spaces $M_j$ and an offset vector v, the control points $m_j$ of the B-spline offset curve approximation are:

$$m_j = M_j v + b_j \quad (12)$$

where the local coordinate transformation is a product of scale, twist, and rotation:

$$M_j = S_j W_j R_j \quad (13)$$

FIG. 12 illustrates an example implementation of step 214 (FIG. 2), namely, the determination of the deformed model point's position 1200 on the new, deformed offset curve 1100. In some embodiments, this step may be performed for each of the plurality of model points, e.g. deformed model point 1200, as follows. Namely, the control points 1102, 1104, 1106, 1108, 1110, and 1112 calculated above may be substituted into an equation that is representative of the influence curve 600 to determine the position of the corresponding deformed model point 1200.

More specifically, the interpolated point $m(\tau)$ may be found using equation 11.

Therefore, in accordance with an embodiment of the present invention, this method may be applied to an offset primitive constructed only for evaluation at a single point, providing position without the baggage of the local topology of the offset primitive.

Figure 13A:
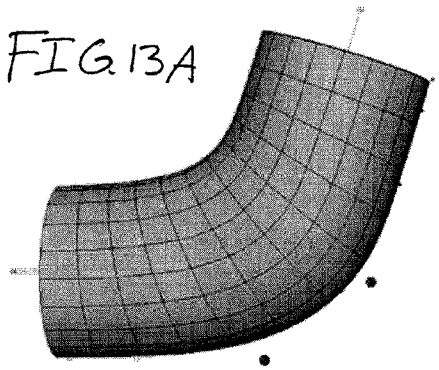
FIGS. 13A, 13B, 13C, 13D, 13E, 13F, 13G, and 13H are diagrams illustrating artist control of spatial variation along an influence curve in accordance with an embodiment of the present invention.
Figure 13B:
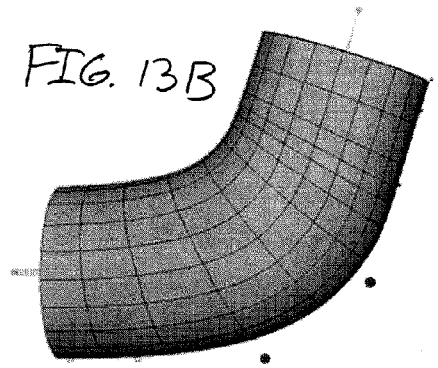
Figure 13C:
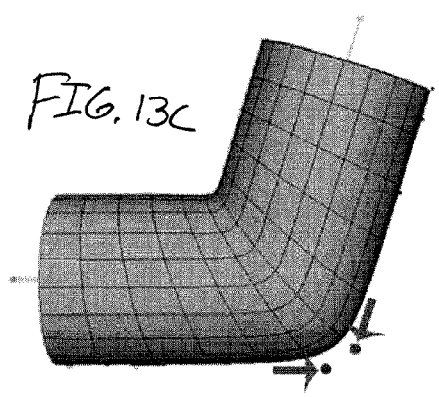
Figure 13D:
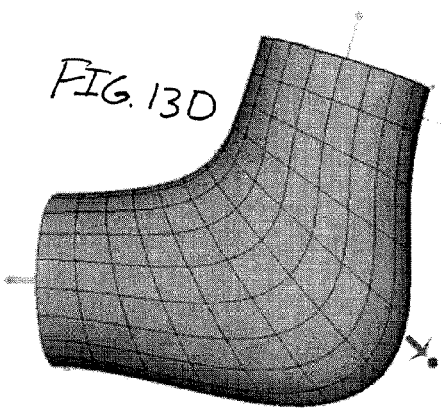
Figure 13E:
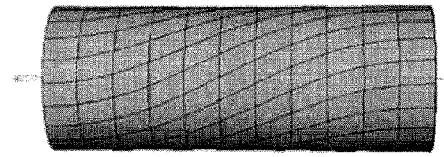
Figure 13F:
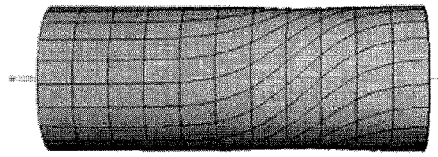
Figure 13G:
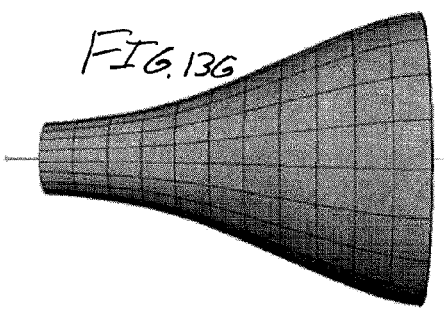
Figure 13H:
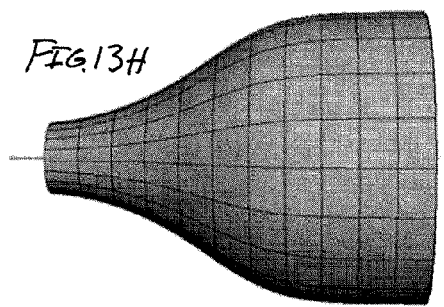

Although the algorithm attempts to minimize parametric non-uniformity through its approximation of arc-length as bind parameter, it allows for finer artist control in displacing the offset curve along and normal to its local twist axis, as well as parametric rescaling and sliding. Examples of artist control of spatial variation along the influence curve are shown in FIGS. 13A-13H. Specifically, FIG. 13A illustrates a default position. FIG. 13B illustrates that default FIG. 13A when it is reparametrized. Then, FIG. 13C illustrates default FIG. 13A with tangential offset of control points, allowing for a more natural shape and volume. FIG. 13D illustrates default FIG. 13A with normal offset of control points, illustrating an unnatural deformity. FIGS. 13E and 13F illustrate artists adjusting the twist distribution where 13E illustrates uniformed twisting and 13F illustrates the non-uniformed twisting, and FIGS. 13G and 13H illustrate artists adjusting the scale distribution.

In some embodiments, pose blending may be used for more precise control. For example, the OCD implementation can store hand-modeled shape targets in local space, and hence works well with pose space blending techniques such as [see Lewis et al. 2000, cited below] to interpolate between the various modeled pose targets.

For efficiency, blend weights are computed solely from skeletal animation, independent of the posed target models, so they need not be recomputed and stored for each model point.

The number of modeled target poses needed to achieve a desired look decreases with the quality of the skinning deformation algorithm. OCD (especially with the B-spline offset model) allows for fewer poses and results in fewer artifacts than previous methods.

Regarding a timing comparison, the following timing tests were performed on an Intel Xeon 3.4 GHz CPU 32-bit workstation, running CentOS 4.1 Linux without multithreading. All these timings were done within Autodesk™ Maya 8.5, with the techniques implemented as Maya deformers. A cylindrical model similar to that shown in FIGS. 2A-2F was sampled at various resolutions to check for a linear increase in bind and deform time as a function of mesh size. As in FIGS. 2A-2F the cylinder bend for this test was generated from three transform influences input into the LBS and Dual Quaternion methods, and one curve influence for the Maya wire and OCD deformers.

Regarding bind times, in some embodiments, the bind refresh rate may be less critical than the deform time. Table 1 below compares the frame rate for various algorithms when a rebind is forced every time.

TABLE 1

| Deformation Technique | Bind Refresh Rate (fps) | | |
|---|---|---|---|
| | 10k pts | 20k pts | 40k pts |
| Linear Blend Skinning | 34.2 | 18.1 | 10.1 |
| Dual Quaternion | 20.9 | 10.8 | 5.7 |
| Maya Wire Deformer | 7.3 | 3.7 | 1.9 |
| OCD Arc-Segment | 11.1 | 5.7 | 2.9 |
| OCD B-spline | 3.1 | 1.6 | 0.8 |

Regarding deform times, in some embodiments, the deform refresh rate may be important for interactive usability. Table 2 below compares the frame rate for various algorithms when a rebind is not triggered. The OCD algorithms are less than a factor of 2 of the other algorithms.

TABLE 2

| Deformation Technique | Bind Refresh Rate (fps) | | |
|---|---|---|---|
| | 10k pts | 20k pts | 40k pts |
| Linear Blend Skinning | 34.2 | 18.1 | 10.1 |
| Dual Quaternion | 20.9 | 10.8 | 5.7 |
| Maya wire deformer | 42.3 | 23.8 | 12.8 |
| OCD arc-segment | 29.5 | 15.3 | 8.2 |
| OCD B-spline | 25.3 | 13.2 | 6.9 |

In some embodiments, OCD may be applied to computer graphics (CG) characters in feature films, both VFX and animation, and other films, videos, shows, or content. Typically, animated films do not need pose space blending, whereas live-action VFX may require additional pose blending. That is, OCD may be used without pose space blending for characters in animated features. Or, OCD may be combined with pose space blending, such as for the base deformations of characters.

In some embodiments, the B-spline offset model may be more general, intuitive, and amenable to artist control than the arc-segment offset model. In some embodiments, the B-spline offset model may require more tweaking of parameters to get the same look as the arc-segment model out of the box on knuckle and elbow bends.

As mentioned earlier, in some embodiments the B-spline bind computation may be slower than other techniques, which can become an issue if a rebind is triggered every frame, as in the case where the model is deformed prior to OCD (e.g. a character pulling up her sleeve). In this case, the arc-segment offset curve model may be more advantageous to use because its bind cost is much less.

In some embodiments, pose blending, which gives users exact control over the look of a given pose, works well for adding subtle nuances but becomes problematic for the pose target shapes that deviate significantly from the base deformations, with a rapid increase in the number of different combinations of poses to consider. It takes skill and experience to know when to apply a new pose and when to refine the base layer deformations. Pose blending may be successful in the VFX environment, where the character's range of motion is constrained to a smaller range of physically realistic skeletal poses. In most feature-animated films, the characters have a less-defined range of motion, a smoother look, and do not require the extra cost of modeling and blending from multiple poses. In this case, the base deformation technique (OCD) offers more control than previous techniques.

Multicore processors and modern graphics cards are now common. In some embodiments, point deformers, including embodiments of the above-described OCD algorithm, may be implemented in a parallel/GPU implementation. Both of these technologies may give significant gains to the embodiments.

Thus, various embodiments of a process of deformation from skeletal animation has been described. In some embodiments, a process of spatially-varying spline-based deformation from skeletal animation has been described. Some embodiments provide improvements to existing curve-driven skeletal animation techniques which reduce surface strain and interpenetration, and increase user control. In some embodiments, this may be accomplished through the introduction of splines offset from the influence curve that pass through the surface points. True world-space offset curves are expensive to compute and provide only 1-D control. In some embodiments of the present invention, the influence curve control points are offset in their respective local spaces and used to approximate a locally-offset spline. In some embodiments, the Frenet frame has been abandoned in favor of a user-supplied rotation and scale for intuitive user control. Also, the "point on a stick" approach is abandoned in some embodiments, whereby the mesh vertex depends on the local space of the bind point in favor of a parametric mapping from influence curve to offset spline, resulting in intrinsically smooth surface deformation. Although the method, in some embodiments, has a higher bind-time cost than traditional bind-offset skeletal skinning techniques, the deformation time is comparable, and both may be well worth the difference in a production environment where quality and artist time may be more important than speed.

As has been described, skin deformation based on an underlying skeleton is a standard practice in character animation. An early technique, linear blend skinning (LBS), is appealing due to its simplicity and ease of implementation on modern GPUs. However, linear blend skinning suffers from well-known drawbacks, most notably volume loss due to point averaging, although these can be reduced using several published techniques that impose additional work on the setup artist. Recently published techniques such as the Dual quaternion and Spherical blend skinning improve on this somewhat, but still do not produce natural looking deformations in areas of high curvature. Linear blend skinning is also known as skeletal subspace deformation (SSD). This is basically the Maya skin Cluster.

Another class of techniques improves the deformation quality by using the skeleton to deform a set of intermediate primitives that in turn drive the high resolution model, such as Maya's wire deformer [see Singh 98, cited below] or Curve Skeleton Skinning [see Wang 06, cited below]. By restricting these intermediate primitives to simple quick to compute cases, such as B-splines, deformations can be achieved on the same order as skinning techniques. However, these techniques typically suffer from the problem of offset distortion, which increases with the distance of a deformed point from its intermediate primitive.

As described above, embodiments of the present invention solve this offset distortion problem by using the input primitive to generate and drive an offset primitive (one for each surface point) which passes through the point in model space. In some embodiments, an influence curve may be used to generate and drive an offset spline for each deformed point, which passes through that point in model space. As the input primitive is deformed, the point remains fixed on the deforming primitive. Having a unique deforming primitive per point also gives the user an extra level of control of its deformation. For example points inside a bend can slide out to avoid self-intersection, and points on the outside of a bend can slide in to reduce stretching.

In some embodiments, the above-described implementations allow in a natural way for the blending of influences affecting a given point, for example using linear blending via artist-painted per-influence weight maps. It also may support skeleton-driven pose space deformation for exact control of the shape at a given pose. The bind-time cost may be minimized by using a rapidly-converging iterative bind-point and offset search technique. In some embodiments, the algorithm is robust with respect to variation of bind point, having at most a quadratic dependence on it, so high accuracy is not required.

Figure 14:
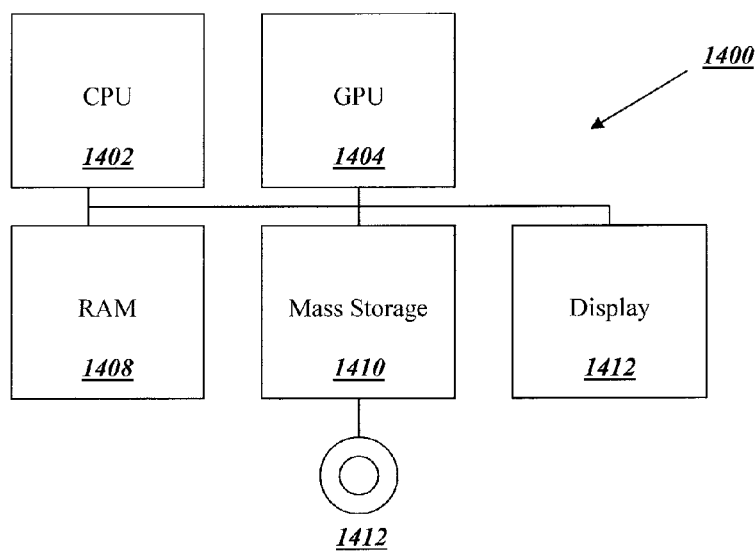
FIG. 14 is a block diagram illustrating a computer or other processor based system that may be used to run, implement and/or execute the methods shown and described herein in accordance with the embodiments of the present invention.

The methods and techniques described herein may be utilized, implemented and/or run on many different types of systems. Referring to FIG. 14, there is illustrated a system 1400 that may be used for any such implementations. One or more components of the system 1400 may be used for implementing any system or device mentioned above, such as for example any of the above-mentioned animation techniques, skinning techniques, etc. However, the use of the system 1400 or any portion thereof is certainly not required.

By way of example, the system 1400 may include, but is not required to include, a central processing unit (CPU) 1402, a graphics processing unit (GPU) 1404, a random access memory (RAM) 1408, and a mass storage unit 1410, such as a disk drive. The system 1400 may be coupled to, or integrated with, any of the other components described herein, such as a display 1412. The system 1400 comprises an example of a processor based system. The CPU 1402 and/or GPU 1404 may be used to execute or assist in executing the steps of the methods and techniques described herein, and various program content, images, models, skeletons, animations, representations, and interfaces may be rendered on the display 1412.

The mass storage unit 1412 may include or comprise any type of computer readable storage or recording medium or media. The computer readable storage or recording medium or media may be fixed in the mass storage unit 1410, or the mass storage unit 1410 may optionally include removable storage media 1414, such as a digital video disk (DVD), Blu-ray disc, compact disk (CD), USB storage device, floppy disk, or other media. By way of example, the mass storage unit 910 may comprise a disk drive, a hard disk drive, flash memory device, USB storage device, Blu-ray disc drive, DVD drive, CD drive, floppy disk drive, etc. The mass storage unit 1410 or removable storage media 1414 may be used for storing code that implements the methods and techniques described herein.

Thus, removable storage media 1414 may optionally be used with the mass storage unit 1410, which may be used for storing code that implements the methods and techniques described herein, such as code for creating the above-described audio effects. However, any of the storage devices, such as the RAM 1408 or mass storage unit 1410, may be used for storing such code. For example, any of such storage devices may serve as a tangible computer readable storage medium for storing or embodying a computer program for causing a console, system, computer, or other processor based system to execute or perform the steps of any of the methods, code, and/or techniques described herein. Furthermore, any of the storage devices, such as the RAM 1408 or mass storage unit 1410, may be used for storing any needed database(s).

In some embodiments, one or more of the embodiments, methods, approaches, and/or techniques described above may be implemented in a computer program executable by a processor based system. By way of example, such processor based system may comprise the processor based system 1400, or a computer, entertainment system, game console, graphics workstation, etc. Such computer program may be used for executing various steps and/or features of the above-described methods and/or techniques. That is, the computer program may be adapted to cause or configure a processor based system to execute and achieve the functions described above. For example, such computer program may be used for implementing any embodiment of the above-described steps or techniques for animation, skinning, deformation, etc. As another example, such computer program may be used for implementing any type of tool or similar utility that uses any one or more of the above described embodiments, methods, approaches, and/or techniques. In some embodiments, the computer program may comprise a video game, role-playing game (RPG), or other computer simulation. In some embodiments, program code modules, loops, subroutines, etc., within the computer program may be used for executing various steps and/or features of the above-described methods and/or techniques. In some embodiments, the computer program may be stored or embodied on a computer readable storage or recording medium or media, such as any of the computer readable storage or recording medium or media described herein.

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein. For example, in some embodiments the present invention provides a computer readable storage medium storing a computer program adapted to cause a processor based system to execute steps comprising: establishing an influence primitive; associating the influence primitive with a model having a plurality of model points; and for each of the plurality of model points on the model, determining an offset primitive that passes through the model point.

As another example, in some embodiments the present invention provides a computer readable storage medium storing a computer program adapted to cause a processor based system to execute steps comprising: establishing an influence primitive; associating the influence primitive with a model having a plurality of model points; deforming the model; and determining a deformed position of each of the plurality of model points by using a separate offset primitive for each model point.

All of the following papers and documents are hereby incorporated by reference herein in their entireties:

GREGORY, ARTHUR, AND WESTON, DAN; 2008; "Efficient Offset Curve Deformation from Skeletal Animation"; Sony Pictures Imageworks; pages 1-7;

BARR, A. H. 1984. Global and local deformations of solid primitives. In *Computer Graphics (Proceedings of ACM SIGGRAPH 84)*, ACM, 21-30;

BARTELS, R. H., AND HARDOCK, R. T. 1989. Curve-to-curve associations in spline-based inbetweening and sweeping. In *Computer Graphics (Proceedings of ACM SIGGRAPH 89)*, ACM, 167-174;

BLOOMENTHAL, J. 2002. Medial-based vertex deformation. In *SCA '02: Proceedings of the 2002 ACM SIGGRAPH/Eurographics symposium on Computer animation*, ACM, New York, N.Y., USA, 147-151;

COBB, E. S. 1984. *Design of sculptured surfaces using the b-spline representation.* Ph.D thesis, Computer Science Dept., University of Utah;

COHEN, E., RIESENFELD, R. F., AND ELBER, G. 2001. *Geometric modeling with splines: an introduction.* A. K. Peters, Ltd., Natick, Mass., USA.

DAM, E. B., KOCH, M., AND LILLHOLM, M. 1998. Quaternions, interpolation and animation. Tech. Rep. DIKU-TR-98/5, Department of Computer Science, University of Copenhagen, July;

ELBER, G., LEE, I.-K., AND KIM, M.-S. 1997. Comparing offset curve approximation methods. *IEEE Computer Graphics and Applications* 17, 3, 62-71;

FORSTMANN, S., AND OHYA, J. 2006. Fast skeletal animation by skinned arc-spline based deformation. In *Eurographics 2006: Short Papers,* 1-4;

HOHMEYER, M. E., AND BARSKY, B. A. 1991. Skinning rational b-spline curves to construct an interpolatory surface. *CVGIP: Graphical Model and Image Processing* 53, 6, 511-521;

HU, S.-M., AND WALLNER, J. 2005. A second order algorithm for orthogonal projection onto curves and surfaces. *Computer Aided Geometric Design* 22, 3, 251-260;

KAVAN, L., AND ZARA, J. 2005. Spherical blend skinning: a real time deformation of articulated models. In *I3D '05: Proceedings of the 2005 symposium on Interactive 3D graphics and games,* ACM, 9-16;

KAVAN, L., COLLINS, S., ZARA, J., AND O'SULLIVAN, C. 2007. Skinning with dual quaternions. In *I3D '07: Proceedings of the 2007 symposium on Interactive 3D graphics and games,* ACM, 39-46;

KHO, Y., AND GARLAND, M. 2005. Sketching mesh deformations. In *I3D '05: Proceedings of the 2005 symposium on Interactive 3D graphics and games,* ACM, 147-154;

KIM, M.-S., PARK, E.-J., AND LEE, H.-Y. 1994. Modeling and animation of generalized cylinders with variable radius offset space curves. *The Journal of Visualization and Computer Animation* 5, 4, 189-207;

LAZARUS, F., COQUILLART, S., AND JANCBNE, P. 1993. Interactive axial deformations. Tech. Rep. RR-1891, INRIA;

LEWIS, J. P., CORDNER, M., AND FONG, N. 2000. Pose space deformation: a unified approach to shape interpolation and skeleton-driven deformation. In *Proceedings of ACM SIGGRAPH 2000,* ACM, 165-172;

RHEE, T., LEWIS, J., AND NEUMANN, U. 2006. Real-time weighted pose-space deformation on the gpu. *Computer Graphics Forum* 25, 3, 439-448;

SHOEMAKE, K. 1994. *Fiber Bundle Twist Reduction.* Academic Press Professional, Inc., San Diego, Calif., USA;

SINGH, K., AND FIUME, E. 1998. Wires: a geometric deformation technique. In *Proceedings of ACM SIGGRAPH 98,* ACM, 405-414;

TILLER, W., AND HANSON, E. G. 1993. Offsets of two dimensional profiles. *IEEE Computer Graphics and Applications* 4, 9, 36-46;

WANG, X. C., AND PHILLIPS, C. 2002. Multi-weight enveloping: least-squares approximation techniques for skin animation. In *SCA '02: Proceedings of the 2002 ACM SIGGRAPH/Eurographics symposium on Computer animation,* ACM, New York, N.Y., USA, 129-138;

WANG, R. Y., PULLI, K., AND POPOVIC, J. 2007. Real-time enveloping with rotational regression. *ACM Transactions on Graphics* 26, 3, 73;

WOODWARD, C. D. 1988. Skinning techniques for interactive b-spline surface interpolation. *Comput. Aided Des.* 20, 10, 441-451; and YANG, X., SOMASEKHARAN, A., AND ZHANG, J. J. 2006. Curve skeleton skinning for human and creature characters: Research articles. *Comput. Animat. Virtual Worlds* 17, 3-4, 281-292.

While the invention herein disclosed has been described by means of specific embodiments and applications thereof, numerous modifications and variations could be made thereto by those skilled in the art without departing from the scope of the invention set forth in the claims.

What is claimed is:

1. A method for use in computer animation, comprising:
    establishing an influence primitive having a plurality of control points;
    associating the influence primitive with a skeleton forming part of a model, the model having a plurality of model points;
    saving a fractional arc-length of a bind point along the influence primitive as a bind parameter;

for each of the plurality of model points on the model not part of the skeleton, determining, by a processor based apparatus, an offset primitive that passes through the model point;

wherein the offset primitive has control points that are offset from the control points of the influence primitive in accordance with a predetermined algorithm; and deforming the skeleton of the model, which deforms the influence primitive to establish a deformed influence primitive, and which deforms the plurality of model points on the skeleton to establish corresponding deformed model points; and for each of the plurality of model points associated with a deformed portion of the skeleton and not on the skeleton, determining a deformed offset primitive using the deformed influence primitive, comprising:

calculating an offset vector v between the influence primitive and the offset primitive; and identifying control points of the deformed offset primitive as separated from a corresponding one of control points of the deformed influence primitive by the calculated offset vector v.

2. The method of claim 1, further comprising:
for each of a plurality of model points, mapping the model point to a point on the influence primitive.

3. The method of claim 1, further comprising:
for each of the plurality of model points, determining a position of the corresponding deformed model point comprising interpolating using the bind parameter.

4. The method of claim 1, wherein the determining the deformed offset primitive using the deformed influence primitive comprises:
determining the deformed offset primitive using the deformed influence primitive and computations made using the offset primitive that passes through the model point.

5. The method of claim 4, wherein:
the influence primitive comprises an influence curve;
each offset primitive comprises an offset curve; and
the computations made using each offset primitive that passes through the model point comprises computing the offset vector v.

6. The method of claim 5, wherein:
the determining the deformed offset primitive further comprises calculating one or more of the control points for the deformed offset primitive using the offset vector v; and
the method further comprises, for each of the plurality of model points, determining a position of the corresponding deformed model point by substituting the one or more control points into an equation that is representative of the influence primitive.

7. The method of claim 4, wherein:
the influence primitive comprises a piecewise-linear influence curve;
each offset primitive comprises an arc-segment offset curve; and
the computations made using each offset primitive that passes through the model point comprises determining a fractional arc-length of a point along the influence primitive.

8. The method of claim 7, wherein the determining a fractional arc-length of a point along the influence primitive comprises using an unfolding operation so that the piecewise-linear influence curve lies flat.

9. A non-transitory computer readable storage medium storing a computer program adapted to cause a processor based system to execute steps comprising:

establishing an influence primitive having a plurality of control points;

associating the influence primitive with a skeleton forming part of a model having a plurality of model points;

saving a fractional arc-length of a bind point along the influence primitive as a bind parameter;

for each of the plurality of model points on the model not part of the skeleton, determining an offset primitive that passes through the model point;

wherein the offset primitive has control points that are offset from the control points of the influence primitive in accordance with a predetermined algorithm; and deforming the skeleton of the model, which deforms the influence primitive to establish a deformed influence primitive, and which deforms the plurality of model points on the skeleton to establish corresponding deformed model points; and for each of the plurality of model points associated with a deformed portion of the skeleton and not on the skeleton, determining a deformed offset primitive using the deformed influence primitive, comprising:

calculating an offset vector v between the influence primitive and the offset primitive; and identifying control points of the deformed offset primitive as separated from a corresponding one of control points of the deformed influence primitive by the calculated offset vector v.

10. The non-transitory computer readable storage medium of claim 9, wherein the computer program is further adapted to cause the processor based system to execute steps comprising:
for each of a plurality of model points, mapping the model point to a point on the influence primitive.

11. The non-transitory computer readable storage medium of claim 9, wherein the computer program is further adapted to cause the processor based system to execute steps comprising:
for each of the plurality of model points, determining a position of the corresponding deformed model point comprising interpolating using the bind parameter.

12. The non-transitory computer readable storage medium of claim 9, wherein the determining the deformed offset primitive using the deformed influence primitive comprises:
determining the deformed offset primitive using the deformed influence primitive and computations made using the offset primitive that passes through the model point.

13. The non-transitory computer readable storage medium of claim 12, wherein:
the influence primitive comprises an influence curve;
each offset primitive comprises an offset curve; and
the computations made using each offset primitive that passes through the model point comprises computing the offset vector v.

14. The non-transitory computer readable storage medium of claim 13, wherein:
the determining the deformed offset primitive further comprises calculating one or more of the control points for the deformed offset primitive using the offset vector v; and
the computer program is further adapted to cause the processor based system to execute steps comprising, for each of the plurality of model points, determining a position of the corresponding deformed model point by substituting the one or more control points into an equation that is representative of the influence primitive.

15. The non-transitory computer readable storage medium of claim 12, wherein:
the influence primitive comprises a piecewise-linear influence curve;
each offset primitive comprises an arc-segment offset curve; and
the computations made using each offset primitive that passes through the model point comprises determining a fractional arc-length of a point along the influence primitive.

16. The non-transitory computer readable storage medium of claim 15, wherein the determining a fractional arc-length of a point along the influence primitive comprises using an unfolding operation so that the piecewise-linear influence curve lies flat.

17. A method for use in animation, comprising:
establishing an influence primitive having a plurality of control points;
associating the influence primitive with a skeleton forming part of a model, the model having a plurality of model points;
saving a fractional arc-length of a bind point along the influence primitive as a bind parameter;
deforming the model, which deforms the influence primitive to establish a deformed influence primitive; and
determining a deformed position of each of the plurality of model points by using a separate offset primitive for each model point comprising interpolating using the bind parameter;
wherein the offset primitive has control points that are offset from the control points of the influence primitive in accordance with a predetermined algorithm;
wherein the determining the deformed position of each of the plurality of model points comprises:
for each of the plurality of model points having deformed positions and not on the skeleton, determining a deformed offset primitive using the deformed influence primitive, comprising:
calculating an offset vector v between the influence primitive and the offset primitive; and
identifying control points of the deformed offset primitive as separated from a corresponding one of the control points of the deformed influence primitive by the calculated offset vector v.

18. The method of claim 17, further comprising:
for each of a plurality of model points on the model, mapping the model point to a point on the influence primitive.

19. The method of claim 18, wherein:
the influence primitive comprises a piecewise-linear influence curve;
each separate offset primitive comprises an arc-segment offset curve; and
the mapping comprises determining a fractional arc-length of the point along the piecewise-linear influence curve.

20. The method of claim 19, wherein the determining a fractional arc-length of a point along the influence primitive comprises using an unfolding operation so that the piecewise-linear influence curve lies flat.

21. The method of claim 18, wherein:
the influence primitive comprises an influence curve;
each separate offset primitive comprises an offset curve that passes through a corresponding one of the plurality of model points; and
the mapping comprises computing the offset vector v.

22. The method of claim 21, wherein:
the method further comprises, for each of a plurality of model points on the model, determining the deformed offset curve primitive by calculating one or more of the control points for the deformed offset curve using the offset vector v; and
the determining a deformed position of each of the plurality of model points comprises, for each of a plurality of model points on the model, substituting the one or more control points into an equation that is representative of the influence curve.

23. A non-transitory computer readable storage medium storing a computer program adapted to cause a processor based system to execute steps comprising:
establishing an influence primitive having a plurality of control points;
associating the influence primitive with a skeleton forming part of a model, the model having a plurality of model points;
saving a fractional arc-length of a bind point along the influence primitive as a bind parameter;
deforming the model, which deforms the influence primitive to establish a deformed influence primitive; and
determining a deformed position of each of the plurality of model points by using a separate offset primitive for each model point;
wherein the offset primitive has control points that are offset from the control points of the influence primitive in accordance with a predetermined algorithm;
wherein the determining the deformed position of each of the plurality of model points comprises:
for each of the plurality of model points having deformed positions and not on the skeleton, determining a deformed offset primitive using the deformed influence primitive, comprising:
calculating an offset vector v between the influence primitive and the offset primitive; and
identifying control points of the deformed offset primitive as separated from a corresponding one of the control points of the deformed influence primitive by the calculated offset vector v.

24. The non-transitory computer readable storage medium of claim 23, wherein the computer program is further adapted to cause the processor based system to execute steps comprising:
for each of a plurality of model points on the model, mapping the model point to a point on the influence primitive.

25. The non-transitory computer readable storage medium of claim 24, wherein:
the influence primitive comprises a piecewise-linear influence curve;
each separate offset primitive comprises an arc-segment offset curve; and
the mapping comprises determining a fractional arc-length of the point along the piecewise-linear influence curve.

26. The non-transitory computer readable storage medium of claim 25, wherein the determining a fractional arc-length of a point along the influence primitive comprises using an unfolding operation so that the piecewise-linear influence curve lies flat.

27. The non-transitory computer readable storage medium of claim 24, wherein:
the influence primitive comprises an influence curve;
each separate offset primitive comprises an offset curve that passes through a corresponding one of the plurality of model points; and
the mapping comprises computing the offset vector v.

28. The non-transitory computer readable storage medium of claim 27, wherein:
the computer program is further adapted to cause the processor based system to execute steps comprising, for each of a plurality of model points on the model, determining the deformed offset primitive by calculating one or more of the control points for the deformed offset primitive using the offset vector v; and the determining a deformed position of each of the plurality of model points comprises, for each of a plurality of model points on the model, substituting the one or more control points into an equation that is representative of the influence curve.

* * * * *

UNITED STATES PATENT AND TRADEMARK OFFICE
CERTIFICATE OF CORRECTION

PATENT NO. : 8,400,455 B2
APPLICATION NO. : 12/349818
DATED : March 19, 2013
INVENTOR(S) : Gregory et al.

It is certified that error appears in the above-identified patent and that said Letters Patent is hereby corrected as shown below:

In the Claims,

Column 20, Line 4, Claim 22, after "offset" delete "curve".

Signed and Sealed this
Ninth Day of July, 2013

Teresa Stanek Rea
*Acting Director of the United States Patent and Trademark Office*